United States Patent
Balko et al.

[11] 3,829,869
[45] Aug. 13, 1974

[54] PHOTO FINISH RECORD SYSTEM

[75] Inventors: Jack E. Balko, Grand Prairie; Davis F. Moffatt, Richardson, both of Tex.; Durward F. Searcy, Shreveport, La.

[73] Assignee: Specialty Instruments Corp., Grand Prairie, Tex.

[22] Filed: Dec. 29, 1972

[21] Appl. No.: 319,193

[52] U.S. Cl. .................................... 95/1.1, 346/107
[51] Int. Cl. .......................................... G03b 17/24
[58] Field of Search ......... 95/1.1, 11.5, 15; 346/107

[56] References Cited
UNITED STATES PATENTS

| | | | |
|---|---|---|---|
| 2,139,703 | 12/1938 | Taylor | 95/11.5 X |
| 3,012,840 | 12/1961 | Kelly | 346/107 |

FOREIGN PATENTS OR APPLICATIONS

| | | | |
|---|---|---|---|
| 489,084 | 8/1918 | France | 95/15 |

*Primary Examiner*—John M. Horan
*Attorney, Agent, or Firm*—Richards, Harris & Medlock

[57] ABSTRACT

A photo finish record system produces a time sequence photograph of race contestants crossing a finish line in alignment with a numerical display of elapsed time: the recording unit of the system has a lens and narrow aperture focusing images of a narrow band including the finish line on a self-developing film carried at constant speed past the lens by a film carriage driven on a linear track by a constant force spring motor acting on the carriage through a cable which is wound on a pulley controlled by a constant speed governor. An electronic clock drives a light emitting diode display producing visible numerical indications of elapsed time, which are projected onto one edge of the film. An automatic control cycle is provided whereby the unit is activated only when signaled by a photoelectric sensor near the finish line. The interruption of a light beam by a contestant nearing the finish line causes the sensor to operate a switching circuit releasing a film advance latch, opening the camera shutter and turning on the lighted time display, all of which functions are deactivated a predetermined time after restoration of the beam to the photoelectric sensor, except that the cycle is retriggerable by another finishing contestant. An opening is provided on the carriage for through the lens alignment of the unit upon actuation of a manual alignment control which releases the film advance latch and stops the carriage with the opening aligned with the lens.

9 Claims, 10 Drawing Figures

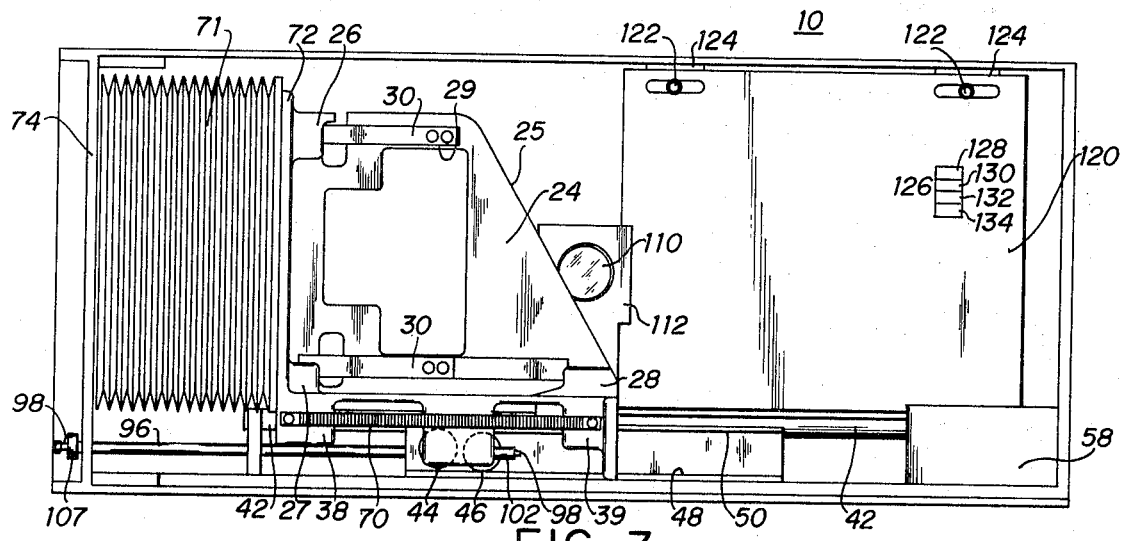
FIG. 3
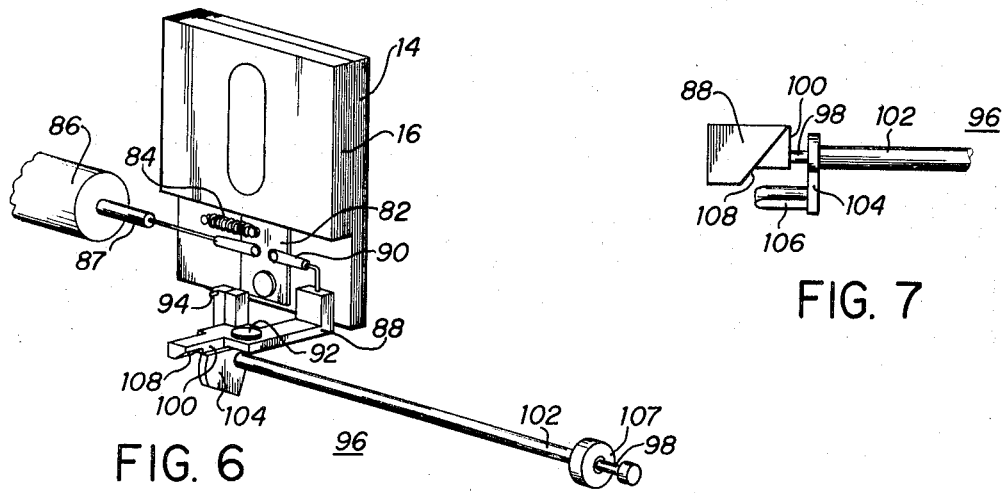
FIG. 6
FIG. 7
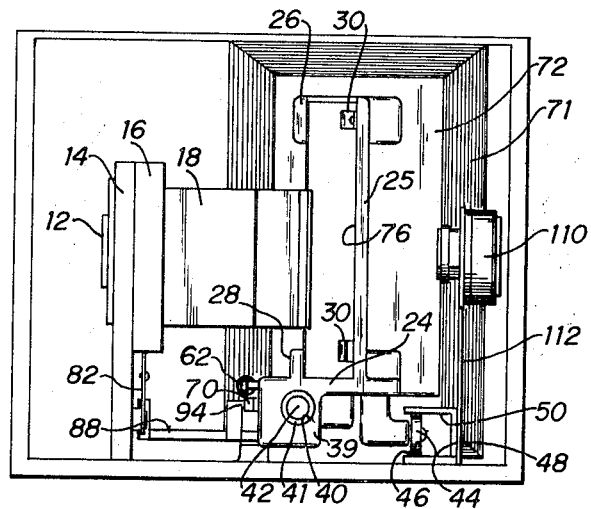
FIG. 5

PATENTED AUG 13 1974 3,829,869

PHOTO FINISH RECORD SYSTEM

This invention relates to a photo finish camera, and more particularly to a system for producing a time sequence photographic record of racing contestants at a finish line with visual indications of elapsed time calibrated in the photograph with the images.

In the field of photo finish camera devices, a number of devices utilizing time sequence photographing techniques have been proposed. Such devices have employed standard negative type photographic film advanced during the exposure period by reel to reel mechanisms.

One of the major disadvantages in such systems has been the necessity for photographic processing of the film once the race is completed. This not only requires developing and printing equipment associated with such processing, but also involves a substantial time lag in producing a photograph.

Moreover, prior art systems heretofore have not made it possible to electronically generate a numerical display of the elapsed time of the race to be projected upon the film so that the photographic record produced by the systems would immediately reveal finishing times for each contestant.

One of the objects of the present invention is to provide a compact and accurate system which will produce a positive self-developing print. A further object of this invention is to provide a film advancing mechanism which will permit utilization of self-developing film in such a system, and which will possess stable constant speed film advance to produce accurate calibration of time with the photographic image.

Another object of this invention is to provide means for electronically timing a race and generating a visible indication of such elapsed time to be placed upon the photograph image, so that the finishing times of all contestants photographed may be accurately determined from the instantly developed photographic print.

A further object of the invention is to provide an automatic control system and cycle for operation of a photo finish system which will permit utilization of the film in correspondence to demand at the finish line.

In accordance with the invention, there is provided a housing adapted to be located in alignment with a race finish line, having a lens for projecting onto a self-developing film in the housing an image of a narrow band including the finish line; means are provided for advancing the film in the housing past the lens at constant speed and for electronically generating visual indications of time and projecting them onto the film adjacent the image projected onto the film from the lens. Control means for the film advancing means are utilized to produce an automatic cycle in which the film advancing means is activated in response to the approach of contestant to the finish line and deactivated after the contestant passes the finish line, such cycle being retriggerable by the approach of a subsequent finishing contestant.

The housing is provided with a linear track extending behind said lens and a carriage slidably mounted on said track is adapted to receive a self-developing film. A constant force spring motor is connected to move said carriage from a starting position along said track, by means of a cable connected to the carriage which engages a pulley controlled by a constant rotational speed governor.

An opening is provided through the film carriage, and an alignment control permits through the lens alignment of the unit by aligning such opening with the lens.

Other features and advantages of the present invention will become more apparent from the following specification, claims and drawings in which:

FIG. 3 is a front elevation of the unit shown in FIG. 1, with certain of the elements shown in FIG. 1 removed;

FIG. 5 is a side view of a portion of the unit shown in FIG. 1;

FIG. 6 is a perspective view of the shutter, latching and manual latch control of the unit illustrated in FIG. 1;

FIG. 7 is an elevation of a portion of the elements shown in FIG. 5;

Figure 1:
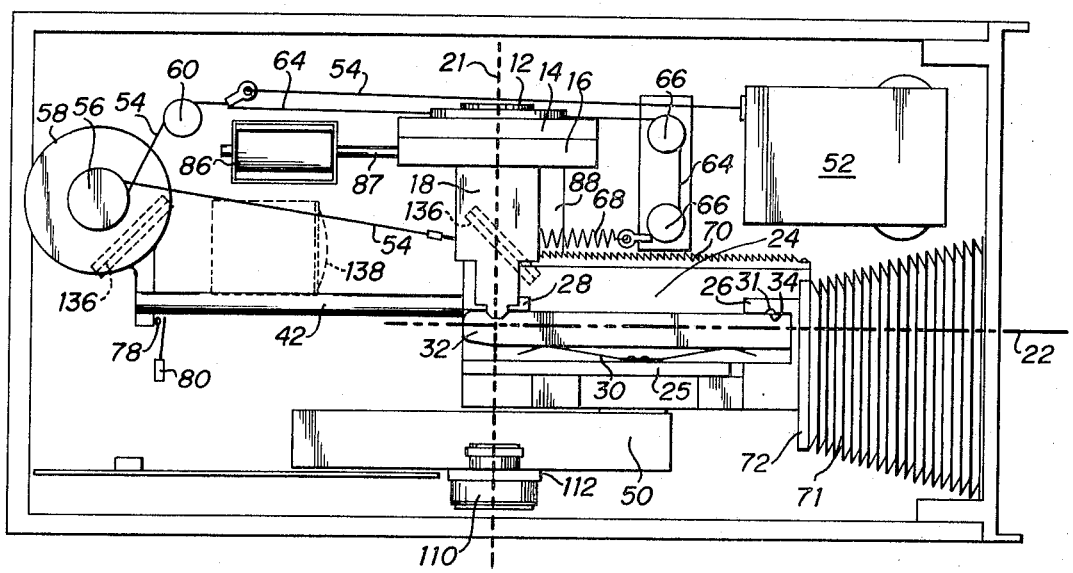
FIG. 1 is a plan view of a recording unit for a system constructed in accordance with the invention.
Figure 4:
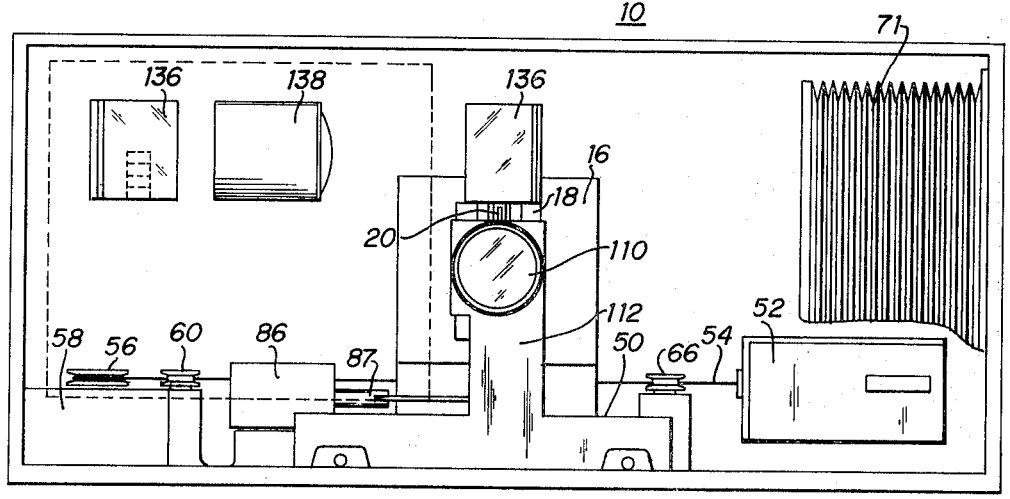
FIG. 4 is a rear elevation of the unit shown in FIG. 1, with certain of the elements shown in FIG. 1 removed.
Figure 2:
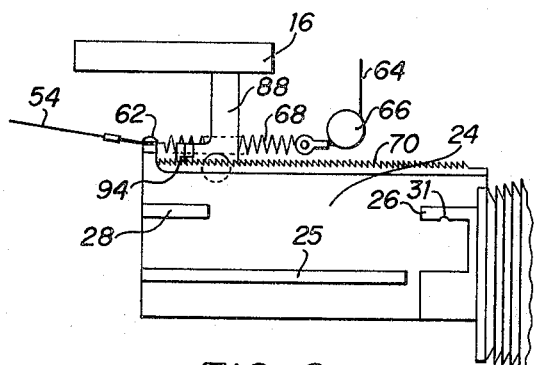
FIG. 2 is a plan view of a portion of the unit shown in FIG. 1, with certain of the elements shown in FIG. 1 removed for clarity.

Referring now to FIG. 1, there is illustrated a record unit generally indicated by reference numeral 10. The unit 10 is a completely closed light tight housing, the walls of which are generally not shown in the drawings. Recording unit 10 has a picture taking lens 12 contained in lens housing 14 and extending outside the front wall of unit 10. A conventional shutter housing 16 is located behind the lens housing 14, providing a shutter mechanism to control entry of light from lens 12. An aperture plate 18 is mounted on the rear of the shutter housing 16. A narrow vertical aperture slot 20 is formed in the end of aperture plate 18 along the optic axis 21 of lens 12. A vertical film plane 22 defined by the dashed line in FIG. 1 falls just behind the aperture slot 20, preferably on the order of about one-tenth of an inch spacing.

Film plane 22 is encompassed by a movable film carriage 24. Carriage 24 has a rear vertical plate 25 and forward mounting flanges 26, 27 and 28, which bracket the film plane 22. Vertical plate 25 has an enlarged opening 29 which reduces the mass of carriage 24 and permits viewing through the opening 29. Plate 25 also carries a pair of horizontal springs 30 adapted to provide a forward locking force on deformation thereof. Flanges 26 and 27 have a vertical depression or detent 31.

A film holder 32 is shown in FIG. 1 engaged in carriage 24 between plate 25 and flanges 26, 27 and 28. The film holder may be a standard Polaroid 545 Land Film Holder, modified by the cutting of an opening in the form of a narrow vertical slot (not shown) aligned with opening 29 in carriage 24. A vertical ridge 34 on film holder 32 is secured in the detent 31 by the action of springs 30 urging the two into engagement. The film holder 32 may receive a standard Polaroid self-developing film (not shown), held by holder 32 in plane 22.

The lower portion of carriage 24 is provided with track engaging flanges 38 and 39 having aligned cylindrical holes 40 bored therein. The carriage 28 is slidably mounted on a cylindrical shaft or track 42 which is received in holes 40. Suitable bearing means 41 are provided at each point of engagement of the carriage 24 with track 42 at holes 40. The rear portion of the carriage 24 is provided with an upper support wheel 44 and a lower support wheel 46. Lower support wheel 46 rides on a raised track 48 carried by the bottom panel of the unit. Upper support wheel 44 is utilized when the unit 10 is mounted in an inverted position as will be explained below, and in such position rolls along upper track 50, which is a horizontal flange carried by the alignment lens mounting described below.

The carriage 24 is thus mounted for free sliding movement along the track 42 supported by either upper support wheel 44 or lower support wheel 46, so that the carriage 24 and holder 26 may be moved past the aperture slot 20.

A continuous driving force on carriage 24 is effected by a constant force spring motor 52 engaged with the carriage 24 by means of drive cable 54. A suitable spring motor is the Neg'ator B, Model ML-2920 manufactured by Ametek/Hunter Spring, Hatfield, Pa., which has a characteristic pulling force of 4 pounds remaining constant throughout the travel of the driving cable 54. Drive cable 54 is wound about a control pulley 56 which is engaged with and controlled by a constant speed governor 58.

A secondary pulley 60 is provided between control pulley 56 and a spring motor 52 to keep the cable 54 clear from adjacent elements. Drive cable 54 is connected to the carriage 24 near its forward end at mounting screw 62. A damper is provided on the drive system by means of damping cable 64 which is connected to the drive cable 54 on the spring motor side of control pulley 56, and which is carried back to mounting screw 62 on carriage 24 by means of pulleys 66 and through damping spring 68. The damper cable 64 and spring 68 serve to absorb the shock of sudden stops of the carriage, and serve to even out the speed of carriage 24 in periods of acceleration.

The forward side of carriage 24 carries a toothed latching rail 70 which extends parallel to the track 42 with its teeth facing forward of the carriage 24. Latching rail 70 cooperates with a latching mechanism for selectively restraining the movement of carriage 24 under the driving force of the motor 52, as will be explained below.

The trailing edge of carriage 24 is connected to one end of an extendible bellows 71. The extendible bellows is mounted to the carriage 24 by means of mounting plate 72. The end of bellow 71 is fixedly mounted to outside panel 74 of the unit. A loading opening 76 is provided in plate 72 so that film, and even the film holder 32, can be placed in, or removed from, the film carriage 24 through the opening. As the carriage 24 moves back and forth along the track 20 bellows 71 expands or contracts to provide a light tight connection at the end of film carriage 24.

A carriage stop 78 is mounted near the end of track 42 for stopping the motion of carriage 24. A limit switch 80 is mounted adjacent the stop 78 for activation upon the impact of carriage 24.

As illustrated in FIGS. 5 and 6, the shutter housing 14 is provided with a shutter lever 82 which operates a shutter (not shown) across the light path from lens 12. The shutter is kept normally closed by the biasing of shutter lever 82 by spring 84. A solenoid 86 having a working shaft 87 is connected to lever 82 so that activation of the solenoid extends shaft 87 which drives the shutter lever 82 into the opening position, to the right in FIG. 5. A latching lever 88 is operatively connected to the shutter lever 82 by means of link 90. Latching lever 88 rotates in a horizontal plane about a pivot 92. A latch point 94 is carried by latching lever 88 so that rotation of latching lever 88 moves latch point 94 into and out of engagement with the teeth of the latching rail 70 to control movement of carriage 24. The latch point 94 is moved free from rail 70 at all times shutter lever 82 is in the open position, and engages rail 70 to lock carriage 24 whenever shutter lever 82 is closed.

A manual latching control 96 is extended through the outside of unit 10 to permit manual control of the movement of latching lever 88 and shutter lever 82. Manual control 96 comprises a pair of concentric shafts slidingly interfitted which may be mounted under track 42. The inner shaft 98, in its normal position, extends toward lever 88 so that its end confronts face 100 of latching lever 88. Inner shaft 98 may be moved inward to act on face 100 moving the latching lever 88 into the unlatched position, also causing shutter lever 82 to open.

The outer shaft 102 of manual control 96 carries an alignment stop 104 and an unlatching cam 106 for cooperation with a camming surface 108 on lever 88. The outer shaft 102 is used for an alignment step, and is operated by clockwise rotation of a control knob 107 provided thereon to place the alignment stop 104 into the path of the carriage 24, which rotation at the same time moves cam 106 against surface 108 to force levers 88 and 82 into the open position. The stop 104 is positioned along the path of travel of carriage 24 so that it will align the opening 29 of carriage 24 and the slot in film holder 31 with the optic axis 21.

A viewing lens 110 used for alignment is mounted in line with the principal lens 12, and extending out the rear wall of unit 10. The viewing lens 110 is supported in its position by a mounting plate 112 which also carries the horizontal upper wheel support track 50.

The control circuitry for operation of the unit 10 may be carried on a printed circuit board 120 which may be mounted inside the unit 10 in any suitable manner, as by use of screws 122 mounting board 120 to a bracket 124 extending downward from the upper panel of the unit 10. A light emitting diode (LED) display 126 is carried on the circuit board 120 and controlled by electronic clock circuitry mounted on board 120. Display 126 comprises four standard "seven segment" numeral blocks, 128, 130, 132 and 134. Block 128 is representative of minutes, block 130 of 10 seconds, block 132 of seconds, and block 134 of tenths of seconds. Blocks 128, 130 and 134, carry a decimal point in their display. While display 126 is activated, the decimal point in block 134 is strobed each one-hundredth of a second to provide an indication to hundredths of a second. The remaining characters in display 126 are illuminated each tenth of a second.

Display 126 is projected onto the film 122 by means of mirrors 136 and focusing lens 138, which may be mounted on the top panel of unit 10. LED display 126 and its associated mirrors 136 and lens 138 are oriented horizontally immediately above the aperture slot 20, so that the image of display 126 will lie immediately adjacent the images formed from the light passing in through lens 12 and aperture 20. The board 126 and its associated optic system are carefully oriented so that the image of the display is precisely aligned with aperture slot 20. The alignment is performed by ensuring that the decimal point in blocks 130 and 134 are exactly along the middle of slot 20, which alignment task can be performed by viewing the display 126 through the viewing lens 110.

Figure 8:
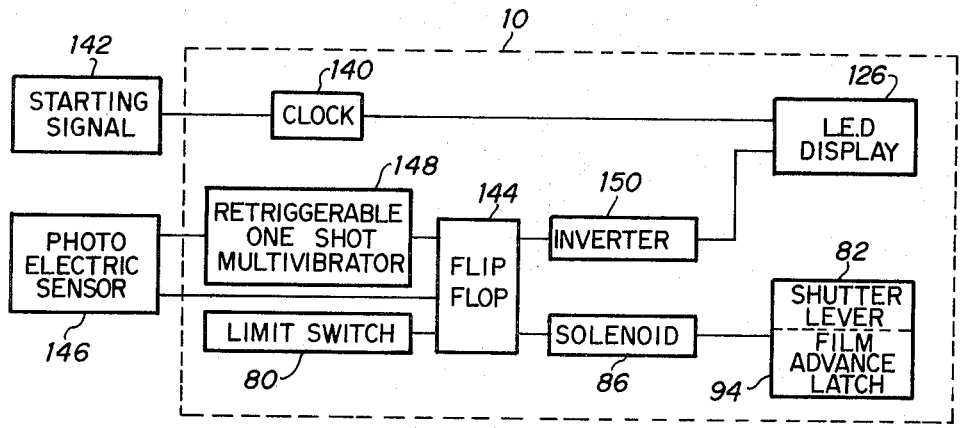
FIG. 8 is a block diagram schematically illustrating a control system which can be used in the present invention.

The control circuitry for the unit 10 is illustrated schematically in FIG. 8. The timing provided by the unit is generated in electronic clock 140. An electric starting signal 142 generated at the beginning of a race is supplied to unit 10 and utilized to initiate the operation of clock 140. The signal may be provided by any convenient device such as a starting pistol having an electric signal output associated with its firing mechanism, or a switch provided on a starting gate.

As previously explained, the opening of shutter lever 82 and releasing of film advancing latch point 94 are automatically controlled by activation of a solenoid 86. Solenoid 86 is operated by a flip-flop circuit 144, and is normally maintained in the off position, with shutter lever 82 closed and latch point 94 engaging rail 70 to secure carriage 24 from movement. Flip-flop 144 is activated by a signal from a photoelectric sensor 146 placed up track from the finish line a short distance. Reversal of flip-flop circuit 144 to return the solenoid to its normally closed position is controlled by a retrigerable one shot multivibrator 148, with a predetermined time delay built into its operation by selection of a resistance value associated with the multi-vibrator 148. Multi-vibrator 148 is cycled by the restoration of the normal state of sensor 146.

Flip-flop 144 also operates an inverter circuit 150 to turn off or on the lights in the LED display 126. In its off state, the flip-flop 144 controls the inverter 150 to maintain the LED display 126 in the off state at all times the shutter lever 82 and film advancing latch 94 are controlled in the off position.

The limit switch 80 is also connected to the flip-flop 144, so that activation of the limit switch 80 will cause flip-flop 144 to turn all circuits off. If it is desired, the automatic sequencing provided by the above described circuitry may be excluded from the unit 10, so that the picture taking function of the camera is initiated and controlled manually without use of automatic sequencing.

Figure 9:
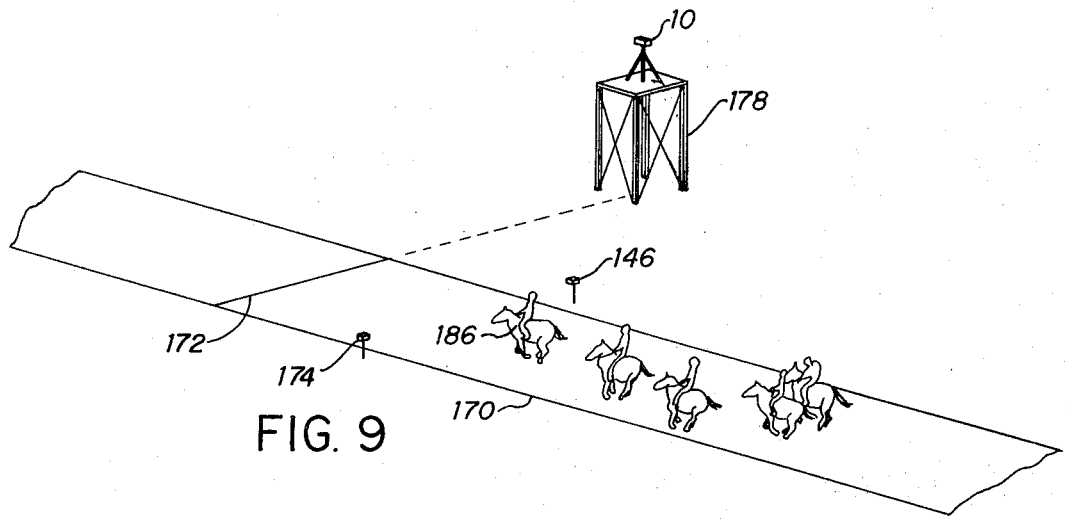
FIG. 9 shows a typical setup at a horse race of a system constructed in accordance with this invention.

FIG. 9 illustrates a setup of a system made in accordance with this invention at a horse race. The track 170 is provided with a finish line 172, and, in the course of the race, horses circle the track to finish line 172. A photoelectric emitter 174 is placed on one side of the track and aligned with photoelectric sensor 146 on the opposite side of track 170. At the finish line, an elevated platform 178 is provided on which the tripod mounted unit 10 is placed. The unit 10 must be aligned exactly with the finish line, utilizing a viewing lens 110. Unit 10 must be oriented so that the direction of film advance under the influence of spring motor 52 is opposite of the direction of the horses. This will necessitate, given a particular side of the track in which the unit 10 is to operate and a given direction of the race, that the camera be placed either rightside up or upside down. Accordingly, the camera is constructed so that operation in either position is possible.

In performing the aligning function, it is convenient to utilize the manual control 96 provided on the unit 10. Rotation of the outer shaft 102 will cause the latch 94 to be released so that the carriage 24 is free to move along the track 42. The alignment stop 104, at the same time, is rotated by the movement of the shaft 102 up into a position in the path of flange 38 of carriage 124, so that the carriage 124 is stopped and held at a predetermined position along its path of travel. In this predetermined position, alignment may be performed by viewing through lenses 110 and 12, which are registered with opening 29 on carriage 24 and the slot cut in film holder 32. Accordingly, when the outer shaft 102 is rotated to activate the alignment function, the carriage 24 is released and moved to, and held in, a position in which through the lens viewing is possible to precisely align the lens with the finish line.

After the camera is aligned with the finish line, the alignment control shaft 102 is returned to its normal position, and the carriage 24 is pulled back to the initial starting position which is illustrated in FIG. 1. The carriage 24 may be pulled back without releasing the latch point 94, but to reduce wear on the latching rail 70 and point 94, it is desirable to push in the shaft 96 to manually free the latch until the carriage is moved into the starting position. The next step is to place a Polaroid self-developing film into the film holder 26.

The system is now ready to operate. Operation is begun by the start of the race which produces the starting signal 142 transmitted to unit 10 to activate clock 140. Clock 140 begins running to electronically time the race with the starting signal 142, but lighted display 126 is not actually illuminated at this time.

In the automatic control sequence, the photograph taking function will be initiated by the passage of the first horse between the photoelectric emitter 174 and sensor 146, breaking a beam and causing a signal to be generated by the sensor 146 to operate flip-flop 144. Flip-flop 144 activates solenoid 86, opening the shutter lever 82 and releasing the latch 94 so that the image of the horse passing through the finish line is generated on the moving film plane 22.

The retriggerable vibrator 148 operates to return the flip-flop 144 to its normal state a predetermined length of time after the passage of the horse has restored the light beam to sensor 146. In a horse race, where the photographic emitter 174 and sensor 146 might be placed approximately 10 feet from the finish line, a suitable delay time for the multi-vibrator 148 is approximately 0.12 seconds. Such time, of course, will depend upon the speed and length of the contestants, and would be set in accordance with the type of race.

The passage of a subsequent horse between the photoelectric sensor and emitter will cause a repeated cycle of the mechanism as described above. In the event two contestants are so close as to pass between the photoelectric sensor and emitter that the flip-flop has not turned the circuit off after passage of the first horse before the second breaks the beam, the retriggerable nature of multi-vibrator 148 will cause the cycle to be renewed, so that the device will remain in actuated state until the predetermined time length after the passage of the second horse restores the photoelectric beam. In the race illustrated in FIG. 9, for example, this has happened with respect to the fourth and fifth finishing horses.

Figure 10:
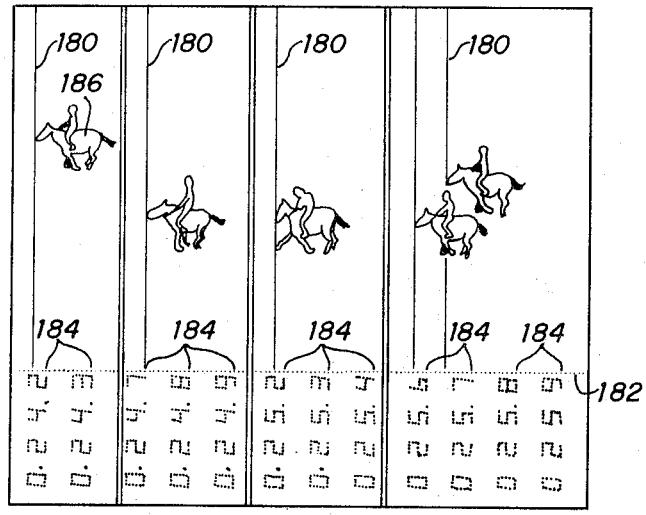
FIG. 10 shows a photographic record made in accordance with this invention.

The process described above is repeated until the carriage 24 completes its path of travel and activates the switch 80 to turn off all the operating circuits. Then the film may be removed from the film holder 26, and a finished picture will be available in a short time. The carriage 24 may be pulled back to its starting position for the insertion of a new film to record the results of the next race. A photographic record of a race made in accordance with the invention is illustrated in FIG. 10. The photograph illustrated is taken in accordance with the automatic control sequence, and represents a time sequence image of the contestants as they passed through the narrow exposure band at the finish line. The width of the image band is approximately 2 inches.

The finishing time of each horse is determined on the photograph by the alignment of each horses nose with an imaginary line 180 perpendicular to the line of decimals 182 which represent hundredths of a second. Each tenth of a second is represented by the decimal point 184 aligned with the base of the numerical images, and the time is read by counting hundredths marks along line 182 from the nearest tenth. In the illustration, the winning horse 186 finished at a time of 24.17 seconds. The times of the other horses shown are 24.70, 25.18, 25.57 and 25.64.

Although an automatic control sequence and apparatus has been described, it is possible to utilize a unit such as that illustrated without such control. In the non-automatic mode, the shutter opening, film advance and lighted display, may be initiated by a manual trigger as the contestants approach the finish line, and the picture taking function will perform for as long as it takes the carriage 24 to travel to the limit switch 80, or about 1½ to 2 seconds.

It will be obvious to those skilled in the art to make various changes, modifications and alterations, to the construction shown. It is intended that such changes are within the scope of the present invention and that the present invention be limited only by a fair interpretation of the appended claims.

What is claimed is:

1. A photofinish record system comprising:
a housing adapted to be located adjacent a race finish line;
a lens on said housing for projecting onto a film in the housing an image of a narrow band including said finish line;
means including a carriage slidably mounted on a shaft carrying upper and lower support wheels engaging said housing with controlled drive means for advancing a film in the housing past the lens at constant speed;
means for projecting visual indications of time onto a film adjacent the image projected onto the film for the lens; and
control means connected to the film advancing means providing a control cycle in which the film advancing means is activated in response to the approach of a contestant to the finish line and the film advancing means is deactivated after the contestant passes the finish line.

2. The system of claim 1 wherein said control means include means responsive to the approach of a contestant to the finish line during a control cycle initiated by a prior finishing contestant to retrigger the control cycle to maintain activation of the film advancing means until after the subsequent finishing contestant passes the finish line.

3. The system of claim 1 where means are provided for maintaining activation of the film advance in the control cycle for a predetermined time period after the contestant passes a point near the finish line.

4. The system of claim 3 wherein the control means includes a light emitter and a photoelectric sensor aligned on opposite sides of the race track near the finish line.

5. The system of claim 1 further comprising a shutter on the lens and a switch for activation of the visual indications of time, and wherein the control means causes the shutter to be open and the switch on only while the film is advancing.

6. A photofinish record system comprising:
a housing and lens mounted thereon;
a track extending in said housing behind the lens;
a carriage slidably mounted on the track;
drive means urging the carriage along the track;
latch means to prevent movement of the carriage;
structure forming an opening in said carriage; and
alignment control means for simultaneously releasing the latch means for interposing a stop in the carriage travel path to stop the carriage with the opening aligned with the lens for through the lens viewing from the rear of the housing.

7. The system of claim 6 further comprising a viewing lens mounted on the rear of the housing in alignment with the first lens.

8. A photofinish record system comprising:
a housing adapted to be located adjacent a race finish line;
a lens on said housing for projecting into said housing an image of a narrow area including said finish line;
a singular shaft within said housing extending behind said lens;
a latch means within said housing;
a carriage, adapted to receive a self-developing film, slidably mounted on said shaft, having idler means engaging said housing to rotationally stabilize said carriage on said shaft, and having a toothed portion thereon adapted to engage said latch means for selectively preventing movement of said carriage;
a spring motor connected to move said carriage from a stationary position along said track through said image projected by said lens;
a means for manual movement of said carriage to its start position for reception of a fresh film; and
a means for effecting control of the movement of said carriage along said shaft which is responsive to the presence of a contestant near the finish line.

9. A photofinish record system comprising:
a housing adapted to be located adjacent a race finish line;
a lens on said housing for projecting into said housing an image of a narrow area including said finish line;
a singular shaft within said housing extending behind said lens;
a latch means within said housing;

a carriage, adapted to receive a self-developing film, slidably mounted on said shaft, having a sleeved aperture therein which encases said shaft to form a single load bearing interface, having bidirectional idler means to dampen rotational movement of said carriage about said shaft so that the record system will operate oriented in any plane which has one line segment parallel to the horizontal axis of said shaft, which idler means engages said housing to rotationally stabilize said carriage on said shaft, and having a toothed portion thereon adapted to engage said latch means for selectively preventing movement of said carriage;

a spring motor connected to move said carriage from a stationary position along said track through said image projected by said lens; and a means for manual movement of said carriage to its start position for reception of a fresh film.

* * * * *